(12) United States Patent
Abedini et al.

(10) Patent No.: US 11,595,913 B2
(45) Date of Patent: Feb. 28, 2023

(54) POWER CONTROL TECHNIQUES FOR A COMMUNICATION SYSTEM THAT INCLUDES A REPEATER

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/213,648

(22) Filed: Mar. 26, 2021

(65) Prior Publication Data

US 2021/0306959 A1 Sep. 30, 2021

Related U.S. Application Data

(60) Provisional application No. 63/002,844, filed on Mar. 31, 2020.

(51) Int. Cl.
*H04W 84/18* (2009.01)
*H04W 52/24* (2009.01)
*H04W 52/52* (2009.01)
*H04W 52/14* (2009.01)
*H04W 74/08* (2009.01)

(52) U.S. Cl.
CPC ....... *H04W 52/248* (2013.01); *H04W 52/143* (2013.01); *H04W 52/146* (2013.01); *H04W 52/24* (2013.01); *H04W 52/52* (2013.01); *H04W 74/0833* (2013.01)

(58) Field of Classification Search
CPC . H04B 7/15; H04B 3/36; H04B 17/40; H04B 7/0413; H04B 17/318; H04B 17/336; H04B 7/0452; H04W 16/28; H04W 84/18
See application file for complete search history.

(56) References Cited

U.S. PATENT DOCUMENTS 11,375,527 B1 * 6/2022 Eyuboglu .......... H04B 7/15528
2003/0211828 A1 11/2003 Dalgleish et al.
2010/0009625 A1 1/2010 Chami et al.

OTHER PUBLICATIONS

International Search Report and Written Opinion—PCT/US2021/024801—ISA/EPO—dated Jul. 7, 2021.

* cited by examiner

*Primary Examiner* — Tu X Nguyen

(57) ABSTRACT

This disclosure generally relates to systems, devices, apparatuses, products, and methods for wireless communication. For example, a communication system may include a repeater that relays communications between communication devices. The repeater determines a downlink gain value to use for one or more downlink initial access messages received at the repeater. The repeater determines an uplink gain value to use for one or more downlink initial access messages received at the repeater. The uplink gain value is based on the downlink gain value and a noise level related to a channel between the communication device and the repeater. The repeater receives a downlink initial access message, and applies the downlink gain value to the downlink initial access message. The repeater receives an uplink initial access message, and applies the uplink gain value to the uplink initial access message.

18 Claims, 8 Drawing Sheets

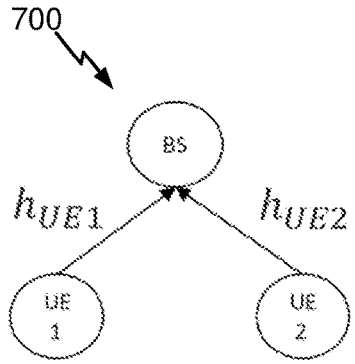

- w/o repeater:
  - $y_{BS}(RACH) = h_{UE1}x_{UE1} + h_{UE2}x_{UE2} + \omega$
  - $|h_{UE1}|^2|x_{UE1}|^2 = |h_{UE2}|^2|x_{UE2}|^2 = P_{targetRACH}$
  - $P_\omega = \sigma^2$

FIG. 7

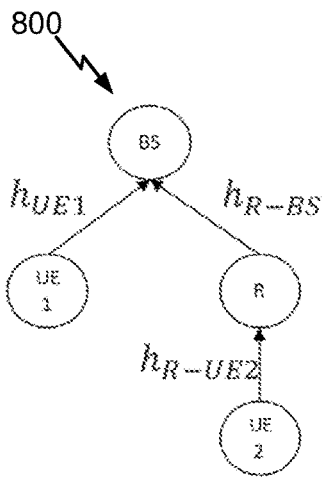

- w/ repeater:
  - $y_{BS}(RACH) = h_{UE1}x_{UE1} + h_{R-BS}\, g_{UL}(h_{R-UE2}x_{UE2} + \omega_R) + \omega$
    $= h_{UE1}x_{UE1} + \hat{h}_{UE2}x_{UE2} + \hat{\omega}$
  - $|h_{UE1}|^2|x_{UE1}|^2 = P_{targetRACH}$
  - $|h_{R-UE2}|^2|x_{UE2}|^2 = \frac{1}{|h_{R-BS}|^2|g_{UL}|^2}\cdot P_{targetRACH} \rightarrow |\hat{h}_{UE1}|^2|x_{UE1}|^2 = \frac{|g_{DL}|^2}{|g_{UL}|^2}\cdot P_{targetRACH}$
  - $|h_{R-BS}|^2|g_{UL}|^2 = \frac{1}{\Delta} \rightarrow P_{\hat\omega} = \sigma^2\left(1+\frac{1}{\Delta}\right) \rightarrow$ noise boost $= 10\log_{10}\left(\frac{P_{\hat\omega}}{P_\omega}\right) = 10\log_{10}\left(1+\frac{1}{\Delta}\right)$
  - Let $\Delta_{dB} = 10\log_{10}(\Delta) \rightarrow$ noise boost $= 3$dB for ($\Delta_{dB} = 0$dB); 1.7dB for ($\Delta_{dB} = 3$dB); 1 dB for ($\Delta_{dB} = 6$dB).
  - Also $\Delta_{dB} = PL_1 - |g_{UL}|^2 = \Delta_{DL,dB} + (|g_{DL}|^2 - |g_{UL}|^2)$, where $PL_1 = -10\log_{10}(|h_{R-BS}|^2)$, and $\Delta_{DL,dB} = P_{TX,B} - P_{TX,R(DL)} = PL_1 - |g_{DL}|^2$.

FIG. 8

POWER CONTROL TECHNIQUES FOR A COMMUNICATION SYSTEM THAT INCLUDES A REPEATER

CLAIM OF PRIORITY

The present Application for Patent claims priority to U.S. Provisional Patent Application No. 63/002,844, entitled "Power Control Techniques for a Communication System That Includes a Repeater," filed Mar. 31, 2020, which is expressly incorporated by reference herein.

TECHNICAL FIELD

This disclosure relates generally to wireless communications, and more specifically, to power control within a repeater communication system.

DESCRIPTION OF THE RELATED TECHNOLOGY

Wireless communications systems are widely deployed to provide various types of communication content such as voice, video, packet data, messaging, broadcast, and other types of content. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes that may simultaneously support communication for multiple communication devices (e.g., user equipment (UE)).

Some wireless signals transmitted within a wireless communication system may be limited by path-loss through the air, physical blockers, or other constraints. To address this issue, wireless communications systems may use wireless repeaters for repeating and extending signals sent between various system nodes. A signal received at a repeater may be a signal transmitted by a base station intended for a UE, a signal transmitted by a UE intended for a base station, a signal transmitted by one UE intended for another UE, or a signal transmitted by one base station intended for another base station.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 7 illustrates an example of a communication system that does not include a repeater.

FIG. 8 illustrates an example of a communication system that includes a repeater.

DETAILED DESCRIPTION

Figure 1:
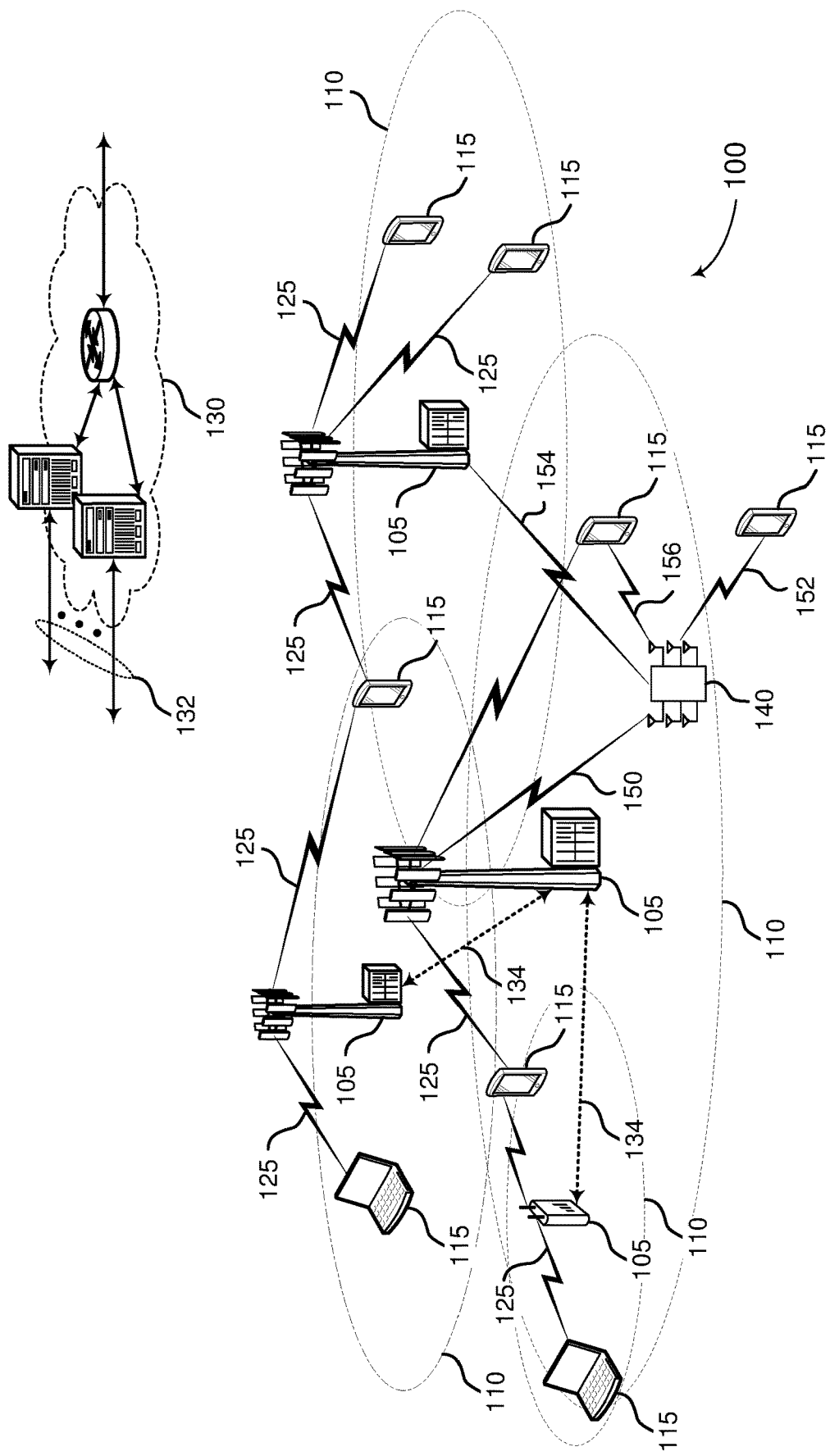
FIG. 1 illustrates an example of a system for wireless communication that supports one or more repeaters in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The systems and techniques described in this detailed description provide various mechanisms for controlling gains and/or transmission power at nodes within a repeater communication system. A repeater in a repeater communication system serves to relay communications between a first device (e.g., a base station, user equipment (UE), or another repeater) and a second device (e.g., a base station, UE, or another repeater). In one example, the repeater receives, amplifies, and forwards a downlink signal sent from a base station intended for a UE. In another example, the repeater receives, amplifies, and forwards an uplink signal sent from a UE intended for a base station.

One issue that may arise in a repeater communication system is how to control the gain value at the repeater for initial access messages received and forwarded through the repeater. During the initial access procedure, a base station may send one or more downlink initial access messages to the UE, and the UE may send one or more uplink initial access messages to the base station. In an example system where a base station and UE communicate through a repeater for the initial access procedure, the system may desire to jointly coordinate the downlink gain value applied at the repeater for the downlink initial access messages in connection with the uplink gain value applied at the repeater for the corresponding uplink initial access messages. In some situations, the system may desire to set the uplink and downlink gain values at the repeater to be equal. In other situations, the system may desire to set the uplink gain value to be different than the downlink gain value.

A controlling node (such as a base station or the repeater itself or another entity) may determine when to set the uplink gain value to be equal to the downlink gain value, and when to make the uplink gain value different than the downlink gain value. In some implementations, the decision by the controlling node as to whether to set the gain values to be equal or different may be based on a noise level related to a channel between the repeater and another device such as a UE transmitting to the base station through the repeater. As one example, the controlling node may choose to set the uplink gain value at the repeater to be equal to the downlink gain value at the repeater in situations when a noise level on a communication channel between a UE and the repeater would result in a relatively high signal-to-noise ratio (SNR) on an uplink communication from the UE through the repeater to the base station. As another example, the controlling node may choose to set the uplink gain value at the repeater to be less than the downlink gain value at the repeater in situations when a noise level on a communication channel between a UE and the repeater would result in a relatively low SNR on an uplink communication from the UE through the repeater to the base station. As will be discussed in the examples below, the controlling node for the power control scheme described herein may be a base station, a UE, a repeater, a network node/function, a cloud-based management entity, or any other control entity. Where the description herein discusses certain implementations with a base station performing actions related to configuring the gain values at the repeater, other example implementations may use other types of controlling nodes to configure the repeater in the same or similar manner.

By setting the uplink gain value to be less than the downlink gain value in certain situations, the system may reduce some noise boosting interference to the system that may occur when the repeater amplifies the noise present on the uplink channel between the UE and repeater. In some implementations, the system dynamically sets the uplink gain value at the repeater based on the corresponding downlink gain value and the noise level between the UE and the repeater. This dynamic gain selection process may allow the system to balance the potentially competing goals of: (1) increasing initial access performance by one or more UEs communicating through a repeater; and (2) increasing global initial access performance for all UEs (including one or more UEs that do not communicate through the repeater). Further details of the disclosed power control techniques will be discussed below (see, e.g., FIGS. 5-10).

FIG. 1 illustrates an example of a wireless communications system 100 that includes one or more repeaters 140 in accordance with aspects of the present disclosure. The wireless communications system 100 includes one or more repeater 140, one or more base stations 105, one or more UEs 115, and one or more core networks 130. In some examples, the wireless communications system 100 may be a Long Term Evolution (LTE) network, an LTE-Advanced (LTE-A) network, an LTE-A Pro network, a fifth generation (5G) New Radio (NR) network, or another type of network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a wireless communication device, a communication device, a mobile device, a wireless device, a remote device, a handheld device, a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130 or via a repeater 140).

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some systems, millimeter wave (mmW) communications may occur in a frequency range (also known as "FR2") that exists above 24 GHz (which may include portions of the total frequency range that are within the millimeter band as well as near the millimeter band). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, a base station 105, UE 115, or repeater 140 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a repeater 140), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, UE 115, or repeater 140) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115, another base station 105, or a repeater 140. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115 or repeater 140) a beam direction for subsequent transmission and/or reception by the base station 105. Additionally, a UE 115 or repeater 140 may perform similar beamforming operations (as described herein for the base station 105) for directional communications with other devices (e.g., a base station, a UE, or another repeater).

Some signals, such as data signals associated with a particular receiving device, may be transmitted by a base station 105 in a single beam direction (e.g., a direction associated with the receiving device, such as a repeater 140). In some examples, the beam direction associated with transmissions along a single beam direction may be determined based at least in in part on a signal that was transmitted in different beam directions. For example, a repeater 140 may receive one or more of the signals transmitted by the base station 105 in different directions, and the repeater 140 may report to the base station 105 an indication of the signal it received with a highest signal quality, or an otherwise acceptable signal quality. Although these techniques are described with reference to signals transmitted in one or more directions by a base station 105, a UE 115 or repeater 140 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115 or repeater 140, which may be examples of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 or a repeater 140 may have one or more antenna arrays that may support various MIMO or beamforming operations.

An individual node (e.g., base station, UE, or repeater) within the wireless communications system 100 may include multiple different communication interfaces each configured for a different type of communication protocol. As one example, a base station 105, a UE 115, or a repeater 140 may include both a wide area network interface (e.g., 4G or 5G cellular) and a local area network interface (e.g., IEEE 802.11 Wi-Fi, or Bluetooth). As another example, a base station 105, a UE 115, or a repeater 140 may include both a high frequency network interface (e.g., mmWave) and a lower frequency network interface that uses a lower frequency band than the mmWave interface (e.g., LTE, sub-6 GHz NR, Wi-Fi, Bluetooth, etc.).

Wireless communications system 100 may include one or more wireless repeaters 140 (also known as a relay or a hybrid node). The repeaters 140 may include functionality of base station 105 and/or UE 115 for repeating, forwarding, relaying, extending, and/or redirecting wireless signals. In some cases, a repeater 140 may be used in line of site (LOS) or non-line of sight (NLOS) scenarios. In a LOS scenario, transmissions, such as mmW transmissions, may be limited by path-loss through air, which may be overcome using beamforming techniques at the wireless repeater 140. In a NLOS scenario, such as in an urban area or indoors, mmW transmissions may be limited by signal blocking or signal interfering physical objects.

The repeater 140 may provide an uplink path from a UE to a base station, a downlink path from a base station to a UE, a P2P or D2D path from one UE to another UE, and/or a wireless backhaul path between the base station and a core network device (e.g., via one or more other base stations). In a first example, a mmW beamforming repeater 140 may be utilized to receive a signal from a base station 105 and transmit the signal to the UE 115, such as by receiving the signal on wireless link 150 and then transmitting the signal on wireless link 152. In a second example, a mmW beamforming repeater 140 may be utilized to receive a signal from a UE 115 and transmit the signal to the base station 105, such as by receiving the signal on wireless link 152 and then transmitting the signal on wireless link 150. In a third example, a mmW beamforming repeater 140 may be utilized to receive a signal from one base station 105 and transmit the signal to a different base station 105 (e.g., in a wireless backhaul configuration), such as by receiving the signal on wireless link 150 and then transmitting the signal on wireless link 154. In a fourth example, a mmW beamforming repeater 140 may be utilized to receive a signal from one UE 115 and transmit the signal to a different UE 115 (e.g., in a P2P or D2D protocol configuration), such as by receiving the signal on wireless link 152 and then transmitting the signal on wireless link 156. In each of these examples, the signal transmitted may be a processed version of the received signal (e.g., an amplified version of the received signal with or without further processing such as signal phase shifting, splitting, and/or combining). Beamforming and gain control techniques may be utilized to improve signal quality between the base station 105, repeater 140, and UE 115 by isolating signals (e.g., via beamforming) and improving or maintaining stability within a signal processing chain of the repeater (e.g., via gain control).

The repeater 140 may include an array of reception antennas and an array of transmission antennas. In some cases, the array of reception antennas and the array of transmission antennas comprise the same set of dual-pole antennas, wherein the dual pole antennas function in a first polarization as the array of reception antennas and the dual pole antennas function in a second polarization as the array of transmission antennas. In some cases, the antennas comprise meta-material antennas or antenna arrays. The repeater 140 may further include a beam control system, which may comprise a processor or system on chip (SoC) for controlling transmit and/or receive beams to reduce signal interference caused by retransmission.

In some cases, the repeater 140 is an analog RF repeater, and the repeater 140 may include a signal processing chain connected (e.g., coupled, linked, attached) between the array of reception of antennas and the array of transmission antennas. The signal processing chain may be implemented as a radio frequency integrated circuit (RFIC), which may include RF/microwave components such as one or more phase shifters, (low noise amplifiers) LNAs, (power amplifiers) PAs, PA drivers, gain controllers, power detectors, or other circuitry. The phase shifters may be controlled by one or more beam controllers for beamforming to reduce signal interference. The signal processing chain may include a feedback path for monitoring the output of one or more PAs, and adjusting gains to one or more PA drivers to the PAs and gains to one or more LNAs based on the output. The gain adjustment may function to stabilize the signal reception and transmission and improve signal quality between devices such as base station 105 and UE 115. Accordingly, through beamforming and gain control, signal quality (e.g., mmW signals) may be improved in LOS and NLOS scenarios.

As described, the repeater 140 may include components (e.g., antenna arrays and signal processing chain circuitry) in the analog/RF domain. Accordingly, in some implementations, the repeater may not include any digital components for certain features described herein. For example, the repeater, in some implementations, may not include any digital signal processing functionality that would allow the repeater to decode and interpret the contents of a received mmW signal. As another example, the repeater, in some implementations, may not include any digital signal processing functionality that would allow the repeater to generate new content for a mmWave signal to be sent to another device. However, in other implementations, the repeater may include additional functionality to allow the repeater to decode signals, interpret the contents of the signals, and generate new signals.

In some cases, the repeater may include one or more side channel components that allow the repeater to decode and interpret other types of messages (e.g., non-mmW signals). For example, the repeater may include a side channel communication interface for sending or receiving control messages. Incoming control messages may include power control messages from a base station 105 or another device, such as instructions regarding a gain to be applied at the repeater or an output power to be used by the repeater. Outgoing control messages may include gain configuration information of the repeater to be sent to the base station. Example side channel communication interfaces may be implemented using one or more of Bluetooth, ultra-wide band, wireless LAN (e.g., IEEE 802.11 Wi-Fi), LTE, or sub-6 GHz NR protocols (or other wireless communication protocols). As such, the repeater may include circuitry and/or processors for transmitting, receiving, and/or processing signals via those protocols and controlling gain levels or output power levels based on those signals one the side channel communication interface.

Figure 2:
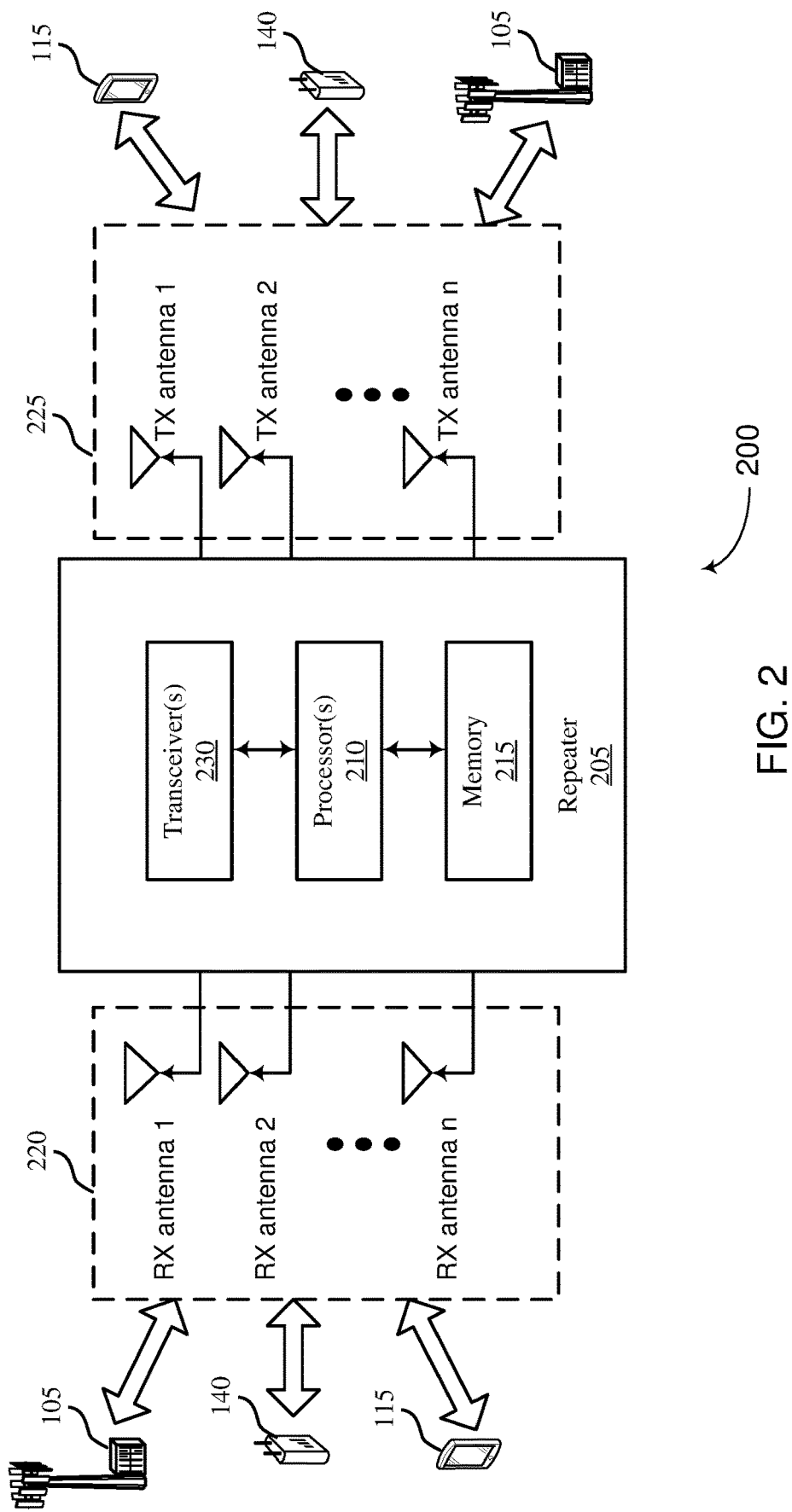
FIG. 2 illustrates an example block diagram of a repeater.

FIG. 2 illustrates an example block diagram 200 of a repeater 205. In some examples, the devices of FIG. 2 may implement aspects of wireless communications system 100, and the repeater 205 may be an example of the repeater 140 of FIG. 1. The repeater 205 includes a reception antenna array 220 including a set of antennas and a transmission antenna array 225 including a set of antennas. In some cases, the reception antenna array 220 and the transmission antenna array 225 are the same antenna arrays including the same set of dual pole antennas functioning in first and second polarizations as the reception and the transmission antenna array. In other cases, the reception antenna array 220 and the transmission antenna array 225 are physically separate arrays. In some cases, the reception antenna array 220 and/or the transmission antenna array 225 comprise meta-material antennas.

The repeater 205 may further include one or more processors 210, memory 215, and one or more transceivers 230. The processor is 210 is coupled with the memory 215, where the processor 210 executes instructions stored on the memory 215 to implement the various functions performed by the repeater 205 described herein. The one or more transceivers 230 may include multiple transceivers to support multiple communication interfaces. In one example, one transceiver may support a first communication technology (e.g., mmWave interface) while another transceiver may support as second communication technology (e.g., a non-mmWave interface, such as an interface associated with LTE, sub-6 GHz NR, Wi-Fi, Bluetooth, etc.). The non-mmWave interface may use a frequency range that is lower than a frequency range associated with the mmWave interface. In another example, one transceiver may support a first radio access technology (RAT) while another transceiver may support a second RAT different than the first RAT.

In some implementations, the repeater 205 uses a first transceiver for sending and/or receiving control messages (e.g., exchanging control messages with a base station), and the repeater 205 uses a second transceiver for sending and/or receiving other signals when the repeater 205 is acting as an amplifying intermediary or relay between two other devices. As one example of using the second interface for relayed signals, the repeater 205 may receive signals from a base station 105 via the second transceiver (associated with a second communication interface of the repeater 205) according to a beamforming configuration and retransmit the signals to a UE 115 via the second transceiver (associated with the second communication interface) according to a beamforming configuration. The repeater 205 may further receive signals from a UE 115 via the second transceiver (associated with the second communication interface) according to a beamforming configuration and retransmit the signals to a base station 105 via the second transceiver (associated with the second communication interface) according to a beamforming configuration. As such, the repeater 205 may function to implement uplink and downlink communications. The repeater 205 may also receive signals from one base station 105 via the second transceiver (associated with the second communication interface) according to a beamforming configuration and retransmit the signals to a different base station 105 via the second transceiver (associated with the second communication interface) according to a beamforming configuration (e.g., for wireless backhaul). The repeater 205 may also receive signals from one UE 115 via the second transceiver (associated with the second communication interface) according to a beamforming configuration and retransmit the signals to a different UE 115 via the second transceiver (associated with the second communication interface) according to a beamforming configuration (e.g., D2D or P2P). Additionally, the repeater 205 may also receive signals from another repeater 140 via the second transceiver (associated with the second communication interface) or send signals to another repeater 140 via the second transceiver (associated with the second communication interface) according to a receive and/or transmit beamforming configuration (e.g., in a multi-hop repeater path).

Figure 3:
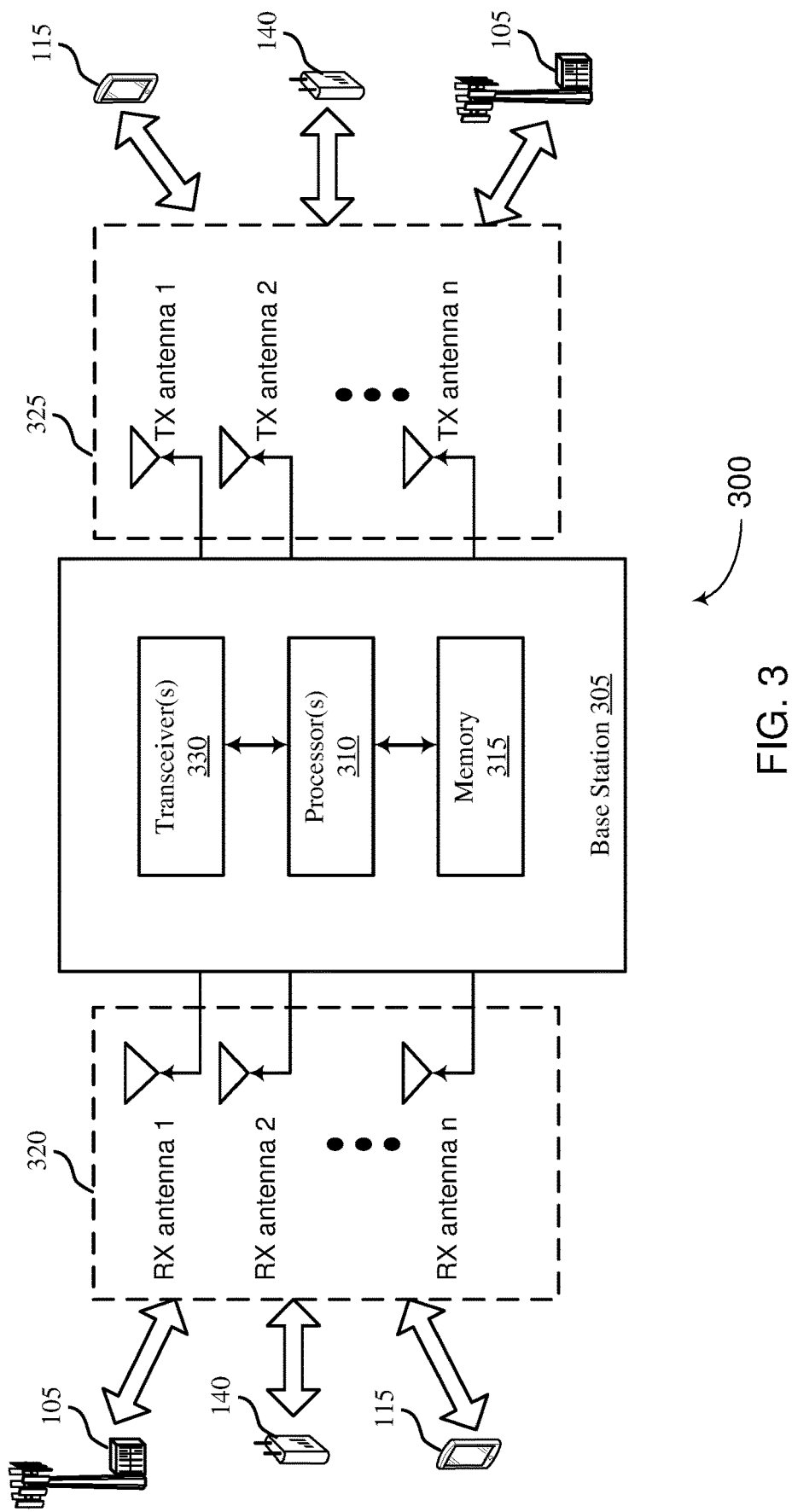
FIG. 3 illustrates an example block diagram of a base station.

FIG. 3 illustrates an example of a block diagram 300 of a base station 305 in accordance with aspects of the present disclosure. In some examples, the devices of FIG. 3 may implement aspects of wireless communications system 100, and the base station 305 may be an example of the base station 105 of FIG. 1. The base station 305 includes a reception antenna array 320 including a set of antennas and a transmission antenna array 325 including a set of antennas. The antenna arrays 320 and 325 may receive signals from, and transmit signals to, various other communication devices, including UEs 115, repeaters 140, and/or other base stations 105.

The base station 305 may further include one or more processors 310, memory 315, and one or more transceivers 330. The processor is 310 is coupled with the memory 315, where the processor 310 executes instructions stored on the memory 315 to implement the various functions performed by the base station 305 described herein. The one or more transceivers 330 may include multiple transceivers to support multiple communication interfaces. In one example, one transceiver may support a first communication technology (e.g., mmWave interface) while another transceiver may support as second communication technology (e.g., a non-mmWave interface, such as an interface associated with LTE, sub-6 GHz NR, Wi-Fi, Bluetooth, etc.). The non-mmWave interface may use a frequency range that is lower than a frequency range associated with the mmWave interface. In another example, one transceiver may support a first radio access technology (RAT) while another transceiver may support a second RAT different than the first RAT.

Figure 4:
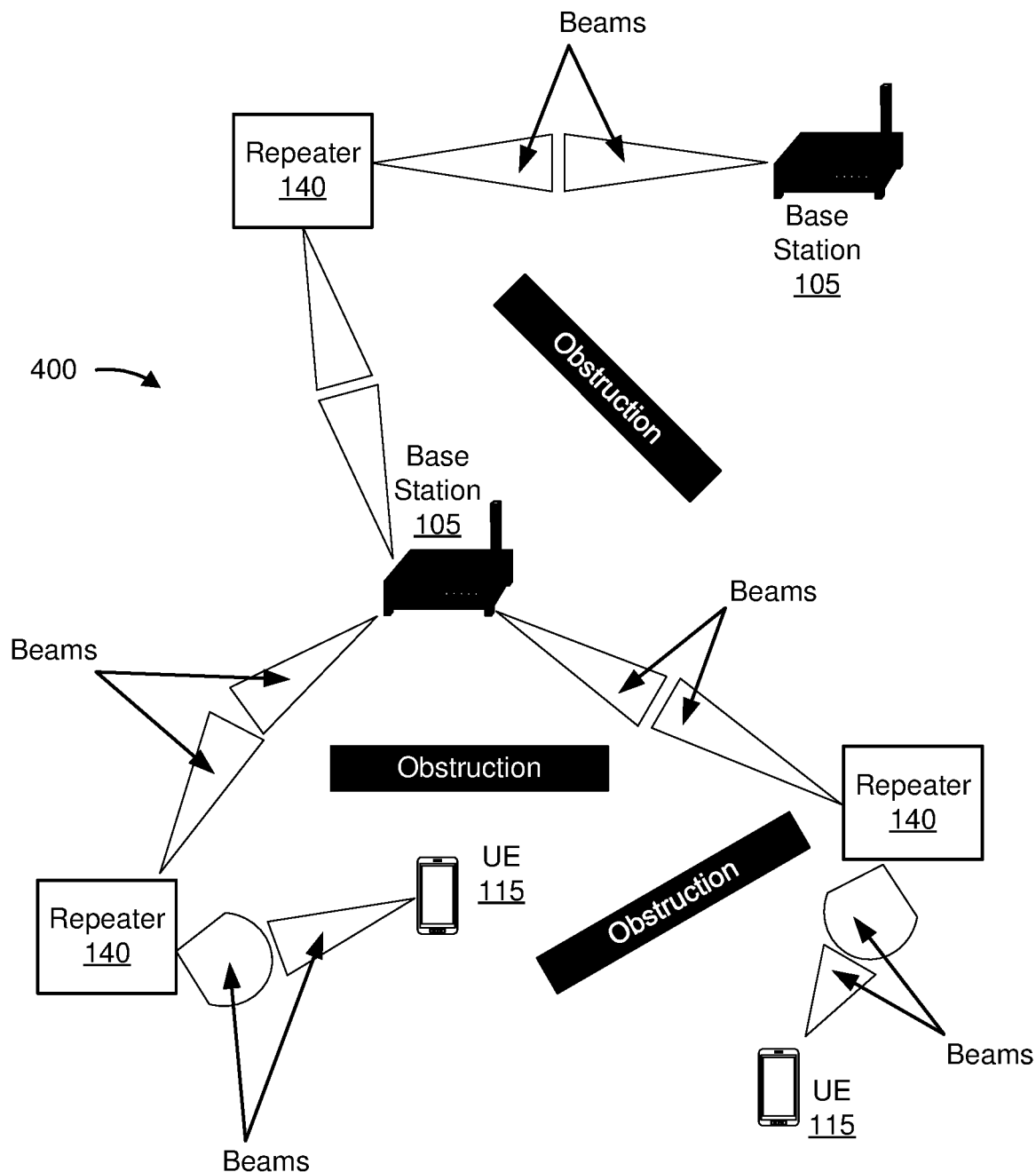
FIG. 4 illustrates an example of a communication system that uses one or more repeaters.

FIG. 4 illustrates an example of a communication system 400 that uses one or more repeaters in accordance with aspects of the present disclosure. FIG. 4 describes the repeaters in the context of mmWave transmissions, although the repeaters may be used for other communication types as well. Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 105 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 105, to extend coverage to UEs 115 without line of sight to the base station 105 (e.g., due to an obstruction), to extend coverage from one base station 105 to another base station 105 (e.g., due to an obstruction or due to other forms of path loss), and/or the like. Furthermore, the millimeter wave repeater 140 described herein may be a layer 1 or an analog millimeter wave repeater, which is associated with a lower cost, less processing, and lower latency than a layer 2 or layer 3 repeater. In other implementations, the repeater 140 may be a layer 2 or layer 3 repeater that has increased communication functionality relative to a layer 1 repeater.

As shown in FIG. 4, a millimeter wave repeater 140 may perform directional communication by using beamforming to communicate with a base station 105 via a first beam (e.g., a backhaul beam over a backhaul link with the base station 105) and to communicate with a UE 115 via a second beam (e.g., an access beam over an access link with the UE 115). Alternatively, the millimeter wave repeater 140 may communicate between two base stations 105 (e.g., in a wireless backhaul link) or between two UEs 115 (e.g., in a D2D or P2P link). To achieve long propagation distances and/or to satisfy a required link budget, the millimeter wave repeater may use narrow beams (e.g., with a beamwidth less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find suitable beam as conditions change due to mobility and/or the like), beam management, and/or the like. This may use resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 105. As shown in FIG. 4, the millimeter wave repeater 140 may use a narrower beam to communicate with the base station 105 without unnecessarily consuming network resources and/or resources of the millimeter wave repeater 140 because the need for beam training, beam maintenance, and/or beam management may be limited, due to limited or no mobility of the base station 105 and the millimeter wave repeater 140 (and/or due to a line of sight communication path between the base station 105 and the millimeter wave repeater 140).

As further shown in FIG. 4, the millimeter wave repeater 140 may use a wider beam (e.g., a pseudo-omnidirectional beam and/or the like) to communicate with one or more UEs 115. This wider beam may provide wider coverage for access links, thereby providing coverage to mobile UEs 115 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities on the mmWave communication interface, resources of the base station 105 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 105 and the millimeter wave repeater 140. In this way, the millimeter wave repeater 140 may increase a coverage area, provide access around obstructions (as shown), and/or the like, while conserving resources of the base station 105, resources of the millimeter wave repeater 140, network resources, and/or the like.

Figure 5:
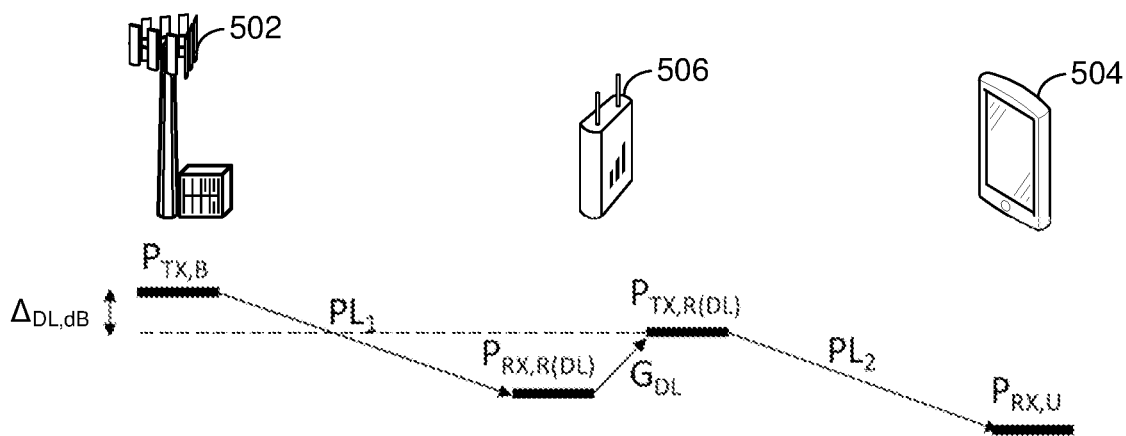
FIG. 5 illustrates an example of a downlink communication path through a repeater.

FIG. 5 illustrates an example of a downlink communication path from a base station 502 to a UE 504 through a repeater 506. In the downlink communication path example of FIG. 5, the base station 502 transmits at power level $P_{TX,B}$, which represents the transmission (TX) power (P) at the base station (B). The transmitted signal experiences an amount of path loss ($PL_1$) when transmitted from the base station 502 to the repeater 506. The path loss results in the transmitted signal being received at the repeater 506 at receive power $P_{RX,R(DL)}$, which represents receive (RX) power (P) at the repeater (R) for a downlink (DL) transmission. The repeater 506 applies a gain ($G_{DL}$) to the signal received from the base station 502. The gain applied to the received signal at the repeater 506 results in the repeater 506 transmitting the signal to the UE 504 at power level $P_{TX,R(DL)}$. The transmitted signal experiences an amount of path loss ($PL_2$) when transmitted from the repeater 506 to the UE 504. The path loss results in the transmitted signal being received at the UE 504 at receive power $P_{RX,U}$, which represents receive (RX) power (P) at the UE (U) for a downlink (DL) transmission. The path loss values ($PL_1$ and $PL_2$) represent any over-the-air losses experienced in the communication channel offset by any transmit array gains or receive array gains applied to the signal, such as beamforming gains.

The difference between the power level $P_{TX,B}$ used at the base station 502 and the power level $P_{TX,R(DL)}$ used at the repeater 506 is represented in FIG. 5 as a delta ($\Delta_{DL,dB}$) The delta value $\Delta_{DL,dB}$ may be customized by the base station 502 to be zero (e.g., a same transmission power level at both devices), or to be another other value to meet the performance goals of the system. The base station 502 may customize, adjust, or dynamically set the delta by selecting the transmission power used by the base station 502, selecting the gain value applied at the repeater 506, selecting the transmission power used by the repeater 506 (which could be used by the repeater 506 to derive the gain value to apply to a received downlink signal), or any combination thereof. Although FIG. 5 illustrates a single repeater between the base station 502 and the UE 504, other implementations may include additional repeaters creating a multi-hop repeater network between the base station 502 and the UE 504.

The gain value ($G_{DL}$) at the repeater 506 may be adjusted by the base station 502 or the repeater itself. The available gain values may be subject to one or more constraints, such as a maximum gain or a maximum output power at the repeater 506. The maximum gain may be established as a function of loop gain, input power, or other factors. In some implementations, the base station 502 jointly sets (or adjusts) its own transmission power and the relays power gain (or transmission power). Having multiple power or gain adjustment points may allow the base station 502 to achieve a desired target receive power at the UE 504, achieve interference management goals, achieve power savings at the base station or the repeater, or any combination thereof.

As one example, the base station 502 may save power at the repeater 506 by setting the gain value at the repeater 506 to a relatively low value within a range of available gain values, thus resulting in a relatively low transmission power level at the repeater 506 which would use less power than if a higher repeater transmission power was used. As another example, the base station 502 may reduce interference in the signal received at the UE 504 by transmitting from the base station 502 at a relatively high value within a range of available transmit power levels, thus avoiding the need for a relatively high gain value at the repeater 506 which may otherwise boost any interference received with the signal incoming to the repeater 506. As yet another example, the base station 502 may achieve a target receive power of the signal at the UE 504 by setting the gain value at the repeater 506 to a relatively high value within a range of available gain values, thus resulting in a higher receive power at the UE 504 than if a lower gain value was applied at the repeater 506.

In the downlink path of FIG. 5, the power transmitted by the repeater may be calculated as $P_{TX,R(DL)}=P_{TX,B}-PL_1+G_{DL}=P_{TX,B}-\Delta_{DL,dB}$, where $\Delta_{DL,dB}=PL_1-G_{DL}$. In some situations, the system parameters may be set so that $\Delta_{DL,dB}=0$ (e.g., repeater PA gain can compensate for the path loss between the base station and repeater and thus the output power of repeater is equal to the output power of the base station). In some situations, $\Delta_{DL,dB}$ may not equal zero, such as if the maximum output transmission power of the repeater may be less than the transmission power of the base station, or if the maximum PA gain of the repeater is less than $PL_1$. The received power of the transmission at the UE may be calculated as $P_{RX,U}=P_{TX,R(DL)}-PL_2=P_{TX,B}-(PL_2+\Delta_{DL,dB})$ Further, the UE may estimate the path loss based on a downlink transmission from the base station, such as a synchronization signal block (SSB) message. The UE is provided with the transmission power of the base station for the SSB (e.g., $P_{TX,B}$) and thus may estimate the effective end-to-end path loss as $PL_{e2e}=PL_1+PL_2-G_{DL}$ (e.g., $P_{TX,B}-P_{RX,U}=PL_2+\Delta_{DL,dB}$).

Figure 6:
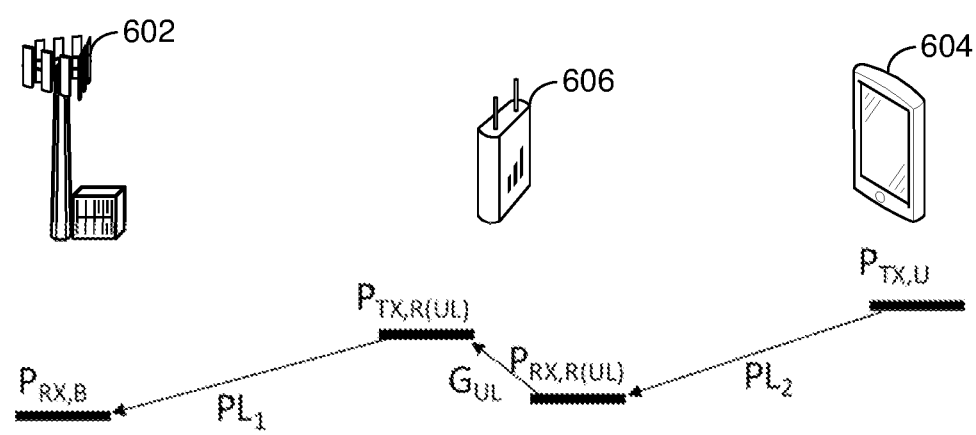
FIG. 6 illustrates an example of an uplink communication path through a repeater.

FIG. 6 illustrates an example of an uplink communication path from a UE 604 to a base station 602 through a repeater 606. In the uplink communication path example of FIG. 6, the UE 604 transmits at power level $P_{TX,U}$, which represents the transmission (TX) power (P) at the UE (U). The transmitted signal experiences an amount of path loss ($PL_2$) when transmitted from the UE 604 to the repeater 606. The path loss results in the transmitted signal being received at the repeater 606 at receive power $P_{RX,R(UL)}$, which represents receive (RX) power (P) at the repeater (R) for an uplink (UL) transmission. The repeater 606 applies a gain ($G_{UL}$) to the signal received from the UE 604. The gain applied to the received signal at the repeater 606 results in the repeater 606 transmitting the signal to the base station 602 at power level $P_{TX,R(UL)}$. The transmitted signal experiences an amount of path loss ($PL_1$) when transmitted from the repeater 606 to the base station 602. The path loss results in the transmitted signal being received at the base station 602 at receive power $P_{RX,B}$, which represents receive (RX) power (P) at the base station (B). The path loss values ($PL_1$ and $PL_2$) represent any over-the-air losses experienced in the communication channel offset by any transmit array gains or receive array gains applied to the signal, such as beamforming gains.

The base station 602 may control the transmission power levels at the UE 604, the repeater 606, or both. For example, the base station 602 may control the difference between the power level $P_{TX,U}$ used at the UE 604 and the power level $P_{TX,R(UL)}$ used at the repeater 606. The delta value between these two transmission levels may be customized by the base station 602 to be zero (e.g., a same transmission power level at both devices), or to be another other value to meet the performance goals of the system. The base station 602 may customize, adjust, or dynamically set the delta by selecting the transmission power used by the UE 604, selecting the gain value applied at the repeater 606, selecting the transmission power used by the repeater 606 (which could be used by the repeater 606 to derive the gain value to apply to a received uplink signal), or any combination thereof. Although FIG. 6 illustrates a single repeater between the base station 602 and the UE 604, other implementations may include additional repeaters creating a multi-hop repeater network between the base station 602 and the UE 604.

The gain value ($G_{UL}$) at the repeater 606 may be adjusted by the base station 602 or the repeater itself. The available gain values may be subject to one or more constraints, such as a maximum gain or a maximum output power at the repeater 606. The maximum gain may be established as a function of loop gain, input power, or other factors. In some implementations, the base station 602 jointly sets (or adjusts) the transmission power of the UE and the power gain (or transmission power) of the repeater. Having multiple power or gain adjustment points may allow the base station 602 to achieve a desired target receive power at the base station 602, achieve interference management goals, achieve power savings at the UE or the repeater, or any combination thereof.

As one example, the base station 602 may save power at the repeater 606 by setting the gain value at the repeater 606 to a relatively low value within a range of available gain values, thus resulting in a relatively low transmission power level at the repeater 606 which would use less power than if a higher repeater transmission power was used. As another example, the base station 602 may save power at the UE 604 by setting the transmission power level at the UE 604 to a relatively low value within a range of available gain values, which would use less power than if a higher UE transmission power was used. As yet another example, the base station 602 may reduce interference in the signal received at the base station 602 by instructing the UE 604 to transmit at a relatively high value within a range of available transmit power levels, thus avoiding the need for a relatively high gain value at the repeater 606 which may otherwise boost any interference received with the signal incoming to the repeater 606. As still another example, the base station 602 may achieve a target receive power of the signal at the base station 602 by setting the gain value at the repeater 606 to a relatively high value within a range of available gain values, thus resulting in a higher receive power at the base station 602 than if a lower gain value was applied at the repeater 606.

In the uplink path of FIG. 6, one system objective may be for the base station 602 to receive an uplink initial access message at a target receive power selected for the uplink initial access message transmission. The uplink initial access message may be a random-access channel (RACH) preamble message, which may also be known as a RACH message 1 (Msg1) transmission. The transmit power of the transmission from the UE 604 may be represented as $P_{TX,U}=P_{targetRACH}+\text{estPL}=P_{targetRACH}+PL_2+(PL_1-G_{DL})$, where $P_{targetRACH}$ is the target base station receive power selected for the uplink initial access message transmission (e.g., the target receive power at the base station for the RACH Msg1 transmission) and estPL is the estimated end-to-end path loss (e.g., an end-to-end path loss estimated at the UE based on a downlink transmission from the base station to the UE). The received power of the transmission at the repeater 606 may be represented as $P_{RX,R(UL)}=P_{targetRACH}+(PL_1-G_{DL})$.

After the repeater 606 amplifies and forwards the uplink initial access message, the received power at the base station 602 may be represented as $P_{RX,B}=P_{RX,R(UL)}+G_{UL}-PL_1=P_{targetRACH}+(G_{UL}-G_{DL})$, where $G_{DL}$ is the gain used at the repeater 606 for a downlink initial access message, such as an SSB message, and $G_{UL}$ is the gain used at the repeater 606 for the corresponding uplink initial access message, such as a RACH Msg1 transmission in response to the SSB message. Given that the receive power at the base station may be represented as $P_{RX,B}=P_{targetRACH}+(G_{UL}-G_{DL})$, it may be beneficial in some situations for $G_{UL}$ to be equal to $G_{DL}$ so that the $P_{RX,B}=P_{targetRACH}$ (e.g., the received power experienced for the uplink initial access message is equal to the target power pre-selected for the uplink initial access message transmission). This allows use of the same uplink and downlink gain values for a RACH opportunity (RO) and the SSB associated with the RO. In many situations, the received power of the RACH message at the repeater 606 is relatively small (e.g., the operating point may be negative SNR), and may be smaller than the received power of the SSB message at the repeater 606. Thus, the same downlink repeater gain can safely be used for uplink RACH amplification and forwarding from the repeater 606 to the base station 602.

However, in other situations, it may be more beneficial to set $G_{UL}$ to be different than $G_{DL}$, such as when the noise level on the path between the UE 604 and the repeater 606 is relatively high. For example, RACH operating SNR may be relatively low in some situations. Thus, the uplink gain value applied at the repeater 606 may result in a noise boosting situation where the repeater 606 amplifies the noise present on the first hop (UE 604 to repeater 606) of the transmission. This amplified noise will then be received by the base station 602 when the repeater 606 forwards the amplified RACH to the base station 602. The amplified noise may potentially interfere with other UEs trying to send RACH messages to the base station 602.

FIG. 7 illustrates an example of a communication system 700 that does not include a repeater. During an initial access procedure for an example system that includes one base station (BS) and two UEs (UE1 and UE2), the signal received by the base station for a RACH opportunity may be represented as $y_{BS}(\text{RACH})=h_{UE1}x_{UE1}+h_{UE2}x_{UE2}+\omega$, where $h_{UE1}$ represents the channel between UE1 and the base station, $x_{UE1}$ represents the signal (e.g., RACH) transmitted from UE1, $h_{UE2}$ represents the channel between UE2 and the base station, $x_{UE2}$ represents the signal (e.g., RACH) transmitted from UE2, and $\omega$ represents the additive noise in the system. The target received power at the base station for a RACH transmission may be represented as $|h_{UE1}|^2|x_{UE1}|^2=|h_{UE2}|^2|x_{UE2}|^2=P_{targetRACH}$. Also, the power of the additive noise in the system may be represented as $P_\omega=\sigma^2$, where $\sigma$ represents a measure of thermal noise.

FIG. 8 illustrates an example of a communication system 800 that includes a repeater. During an initial access procedure for an example system that includes one base station (BS), a first UE (UE1) connecting to the base station without a repeater, and a second UE (UE2) connecting to the base station through a repeater (R), the signal received by the base station for a RACH opportunity may be represented as $y_{BS}$ (RACH)=$h_{UE1}x_{UE1}+h_{R-BS}g_{UL}(h_{R-UE2}x_{UE2}+\omega_R)+\omega$, where $h_{R-BS}$ represents the channel between the repeater and the base station, $g_{UL}$ represents the gain applied by the repeater for the uplink RACH message, $h_{R-UE2}$ represents the channel between UE2 and the repeater, $\omega_R$ represents the received noise at the repeater that will be amplified by the repeater, and $\omega$ represents other system noise. The target received power at the base station for a RACH transmission by UE1 may be represented as $|h_{UE1}|^2|x_{UE1}|^2=P_{targetRACH}$. One relationship between the target receive power, the transmitted signals, the channels, and the repeater gain may be expressed as $$|h_{R-UE2}|^2 |x_{UE2}|^2 = \frac{1}{|h_{R-BS}|^2 |g_{DL}|^2}.$$

$P_{targetRACH}$ where the received power at the base station for a RACH transmission by UE2 is $$|\hat{h}_{UE1}|^2 |x_{UE1}|^2 = \frac{|g_{UL}|^2}{|g_{DL}|^2} \cdot P_{targetRACH}.$$

The total effective noise can be expressed as $\hat{\omega}$: =$h_{R-BS} g_{UL}\omega_R+\omega$. One relationship between the channel, repeater gain value, and noise may be expressed as $$|h_{R-BS}|^2 |g_{UL}|^2 := \frac{1}{\Delta},$$

and the power of the noise $\hat{\omega}$ may be represented as $$P_{\hat{\omega}} = \sigma^2 \left(1 + \frac{1}{\Delta}\right).$$

The delta $\Delta$, in dB, can be represented as $\Delta_{dB}$:=10 $\log_{10} \Delta$=$PL_1$-$|g_{UL}|^2$=$\Delta_{DL,dB}$+($|g_{DL}|^2$-$|g_{UL}|^2$), where $PL_1$:=-10 $\log_{10}|h_{R-BS}|^2$ is the pathloss between the repeater and base station, and $\Delta_{DL,dB}$:=$P_{TX,B}$-$P_{TX,R(DL)}$=$PL_1$-$|g_{DL}|^2$. In one example, the noise boost, i.e.

$$10\log_{10}\frac{P_{\hat{\omega}}}{\sigma^2},$$

created by the amplification at the receiver may be 3 dB for ($\Delta_{dB}$=0 dB), 1.7 dB for ($\Delta_{dB}$=3 dB), and 1 dB for ($\Delta_{dB}$=6 dB).

As shown by the relationships expressed above, a larger $\Delta$ (or $\Delta_{dB}$) value would reduce the impact of noise boosting created by the amplification at the repeater of an uplink message that includes a noise component. In one example, the DL and UL gains at the repeater may be selected to be the same, i.e. $|g_{DL}|^2$=$|g_{UL}|^2$. In this example, $\Delta_{dB}$= $\Delta_{DL,dB}$=$PL_1$-$|g_{DL}|^2$, and a larger $\Delta_{dB}$ is equivalent to larger $\Delta_{DL,dB}$ and smaller $|g_{DL}|^2$. Hence, a larger $\Delta$ (or $\Delta_{dB}$) value may reduce the coverage of downlink initial access messages (e.g., SSBs). In another example, a larger $\Delta$ (or $\Delta_{dB}$) value may correspond to use of an uplink gain value at the repeater that is lower than the downlink gain applied at the repeater for a pair of corresponding initial access messages (i.e. $|g_{UL}|^2$<$|g_{DL}|^2$). In this example, the larger $\Delta$ value may reduce the chance of achieving the target base station receive power for an uplink response (e.g., RACH preamble message) to the SSB message for a UE sending the RACH message through the repeater.

Thus, there are tradeoffs to consider when selecting between a larger $\Delta$ value (e.g., a relatively larger difference between the downlink gain value and uplink gain value, such as a greater than 3 dB difference from downlink gain value to uplink gain value) and a smaller $\Delta$ value (e.g., a relatively smaller difference between the downlink gain value and uplink gain value, such as a 0 dB difference or less than 3 dB difference from downlink gain value to uplink gain value). In the example of FIG. 8, a larger $\Delta$ value used at the repeater would reduce the impact of noise boosting at the base station, which would improve the RACH performance of UE1 (and other UEs not communicating through the repeater) due to less noise interference at the base station. However, a larger $\Delta$ value used at the repeater would reduce the gain amplification for an uplink message, which may reduce the RACH performance of UEs (such as UE2) that do communicate through the repeater. Thus, it may be beneficial for a controlling node in the system, such as the base station, repeater, or another system node, to monitor conditions (e.g., noise conditions on specific links) and select between a relatively larger $\Delta$ value for the repeater in some conditions and a relatively lower $\Delta$ value for the repeater in other conditions. The controlling node may select the relatively larger $\Delta$ value when the noise on the link between the UE2 and the repeater is relatively high (thus, causing some concern to global RACH performance in the network due to interference from repeater noise boosting), and may select the relatively smaller $\Delta$ value when the noise on the link between the UE2 and the repeater is relatively low (thus, not causing as much concern of a large noise boosting issue). The controlling node may also address these tradeoffs and performance goals in other ways. In one example, the controlling node may compensate for a relatively low uplink gain at a repeater for a UE who is connected via the repeater by instructing or configuring this UE to send its uplink messages (such as one or more non-initial RACH messages) at a higher transmission power (e.g., increased by a certain number of dB) than a typical UE that does not connect to the base station via the repeater.

Figure 9:
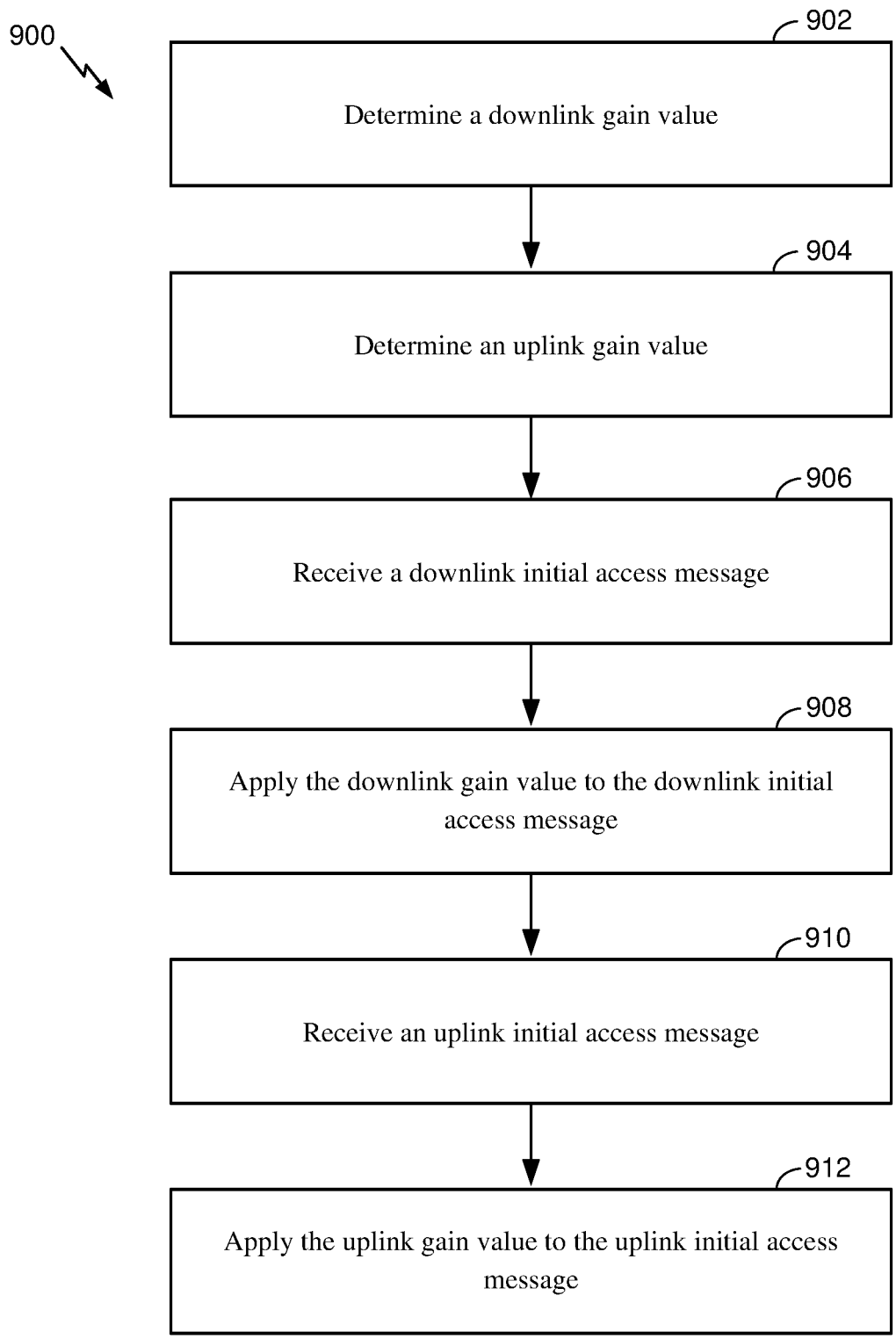
FIG. 9 is a flow diagram illustrating one example of a technique for a repeater to apply a downlink gain value to a downlink initial access message and apply an uplink gain value to an uplink initial access message.

FIG. 9 is a flow diagram illustrating one example of a process 900 for a repeater to amplify and relay communications between a first communication device (e.g., a UE, a base station, or another repeater) and a second communication device (e.g., a UE, a base station, or another repeater). The operations of process 900 may be implemented by a repeater, such as repeater 140 (FIGS. 1 and 4), repeater 205 (FIG. 2), repeater 506 (FIG. 5), repeater 606 (FIG. 6) or one or more sub-components of the repeater. For example, with reference to FIGS. 2 and 9, the operations of process 900 may be performed by one or more transceivers 230 (e.g., the transmission and/or receiving actions of process 900), one or more processors 210, and/or instructions stored in memory 215 that are executed by a processor 210 to enable the repeater to perform the recited actions (e.g., the processing actions of process 900).

At block 902, the repeater determines a downlink gain value to use for one or more downlink initial access messages received at the repeater. In some implementations, the repeater determines the desired downlink gain value locally based on static pre-configured settings or dynamically changing information collected at the repeater (e.g., a noise level or channel conditions or other performance data). In other implementations, the repeater may receive gain configuration information from a controlling node. In some systems, the controlling node that sends the gain configuration information to the repeater may be the same base station that exchanges data traffic with the repeater. In other systems, the controlling node may be a different entity, such as a UE, a second repeater, a second base station different from the base station that sends downlink traffic to be amplified at the repeater, a cloud-based management entity, another network entity or function, or another type of controlling node.

The gain configuration information received at the repeater may include an indication of the downlink gain value to apply at the repeater. The repeater may identify which downlink gain value to use, from multiple possible gain values, based on the gain configuration information received from the controlling node, such as a base station or other entity. The gain configuration information may explicitly recite the downlink gain value, may provide information that allows the repeater to derive the desired downlink gain value, or may provide some other indication of the downlink gain value.

At block 904, the repeater determines an uplink gain value to use for one or more downlink initial access messages received at the repeater. The downlink gain value and uplink gain value may be related in some way. As one example, in some conditions, the uplink gain value may be determined to be equal to the downlink gain value. As another example, in other conditions, the uplink gain value may be determined to be different than the downlink value, such by selecting the uplink gain value to be less than the downlink gain value.

In some implementations, the repeater determines the desired uplink gain value locally based on static pre-configured settings or dynamically changing information collected at the repeater (e.g., a noise level or channel conditions or other performance data). In other implementations, the repeater may receive gain configuration information from a controlling node, such as a base station or other entity. The gain configuration information may include an indication of the uplink gain value to apply at the repeater, either alone or together with an indication of the downlink gain value to apply at the repeater. The repeater may identify which uplink gain value to use, from multiple possible gain values, based on the gain configuration information received from the controlling node, such as a base station or other entity. The gain configuration information may explicitly recite the uplink gain value (e.g., via an explicit instruction or explicit indication of the uplink gain value for use at the repeater), may provide information that allows the repeater to derive the desired uplink gain value, or may provide some other indication of the uplink gain value. In one specific implementation, the gain configuration information may include an offset value usable by the repeater to derive the uplink gain value to apply. For example, the repeater may calculate the uplink gain value based on a reduction relative to the downlink gain value by an amount of the offset value signaled by the controlling node, such as a base station or other entity. The offset value may instruct the repeater to use an uplink gain value that is 0 dB, 3 dB, 6 dB (or any other desired offset value) less than the downlink gain value used for a downlink initial access message associated with the planned uplink initial access message.

The uplink gain value may be based on the downlink gain value and a noise level related to a channel between the repeater and the UE that is sending the uplink communication to be amplified at the repeater. The repeater may determine the relationship between the downlink gain value and the uplink gain value locally or based on gain configuration information received from another device, such as a base station. In some noise level situations, the uplink gain value is selected to be equal to the downlink gain value used for a corresponding downlink initial access message. In other noise level situations, the uplink gain value is selected to be different than the downlink gain value used for a corresponding downlink initial access message.

When the controlling node, such as a base station or other entity, coordinates the selection of gain values at the repeater, the base station (or other controlling node) detects the possibility of a noise boosting situation at the repeater. For example, the base station may determine a noise level between the repeater and the UE that is sending the uplink communication to be amplified at the repeater. The base station may determine this information based on a noise level report sent from the repeater, the UE, or another device. The base station then uses the noise level information to select an appropriate uplink gain level for the repeater to achieve a desired performance goal. For example, the base station may select an uplink gain value for the repeater that is less than the downlink gain value when the base station detects that noise boosting at the repeater may adversely impact its communication with other UEs. As another example, the base station may select an uplink gain value for the repeater that is equal to the downlink gain value when the base station detects that noise boosting at the repeater is less likely to adversely impact its communication with other UEs.

Based on the noise level information acquired by the base station, the base station may send gain configuration information to the repeater that includes an instruction for the repeater to set the uplink gain value to be equal to the downlink gain value in response to a determination at the base station that the noise level is below a threshold. Alternatively, the gain configuration information may include an instruction for the repeater to set the uplink gain value to be less than the downlink gain value in response to a determination at the base station that the noise level is above the threshold.

In some implementations, the repeater may determine the noise level itself and set the uplink gain value accordingly. For example, the repeater may determine the noise level related to the channel between the communication device and the repeater, compare the noise level to a threshold, and select the uplink gain value to be equal to the downlink gain value in response to a determination that the noise level is below the threshold. As another example, the repeater may determine the noise level related to the channel between the communication device and the repeater, compare the noise level to a threshold, and select the uplink gain value to be less than the downlink gain value in response to a determination that the noise level is above the threshold. The noise level determined by the controlling node, base station, or repeater for use in the uplink gain level selection process may be a signal-to-noise ratio (SNR) (which includes other ratios or metrics that quantify an amount of desired signal present in a communication relative to an amount of noise and/or interference present in the communication), and the threshold used for the comparison may be a SNR threshold.

At block 906, the repeater receives a downlink initial access message. The downlink initial access message may be a synchronization signal block (SSB) message or another type of downlink message. At block 908, the repeater applies the downlink gain value determined at block 902 to the downlink initial access message. The repeater then transmits a gain adjusted version of the downlink initial access message to the communication device via one or more transmission antennas of the repeater.

At block 910, the repeater receives an uplink initial access message. The uplink initial access message may be a random-access channel (RACH) preamble message (e.g., RACH Msg1) or another type of uplink message. At block 912, the repeater applies the uplink gain value determined at block 904 to the uplink initial access message. The repeater then transmits a gain adjusted version of the uplink initial access message to the base station via one or more transmission antennas of the repeater.

In some implementations, the repeater may be a millimeter wave repeater, such as a layer-1 millimeter wave repeater. In this configuration, the repeater may receive an analog millimeter wave signal via one or more receive antennas and based on receive beamforming (at block 910), amplify the analog millimeter wave signal without performing analog-to-digital conversion of the analog millimeter wave signal (at block 912), and transmit a gain adjusted version of the analog millimeter wave signal via one or more transmit antennas and based on transmit beamforming.

In the process 900, the repeater may send and receive various communications, including receiving a downlink message (block 906), receiving an uplink message (block 910), transmitting amplified versions of the received messages, transmitting control information (e.g., power configuration parameters sent to the base station or noise level measurements sent to the base station), and receiving control information (e.g., the gain configuration information received from the base station that may be used to determine the gain levels at blocks 902 and 904). These communications may all be on a single radio access technology (RAT) or may be split between multiple RATs. In some implementations, the repeater may use a side link or out-of-band (OOB) communication path for control information. In this option, the repeater uses a first RAT to receive the gain configuration information, and the repeater uses a second RAT, different than the first RAT, to receive the initial access messages (blocks 906 and 910) and transmit the gain adjusted versions of these communications. The first RAT may be a non-mmWave interface, such as an interface associated with LTE, sub-6 GHz NR, Wi-Fi, Bluetooth, etc., and the second RAT may be a mmWave NR interface. In other implementations, the repeater may use a first frequency range within a single RAT to receive the gain configuration information, and the repeater uses a second frequency range, different than the first frequency range, within the single RAT to receive the initial access messages (blocks 906 and 910) and transmit the gain adjusted versions of these communications. In still other implementations, the repeater may use different bandwidth parts (BWPs) for different types of communications. In this option, the repeater uses a first BWP within a single frequency range of a single RAT to receive the gain configuration information, and the repeater uses a second BWP, different than the first BWP, within the single frequency range of the single RAT to receive the initial access messages (blocks 906 and 910) and transmit the gain adjusted versions of these communications.

Figure 10:
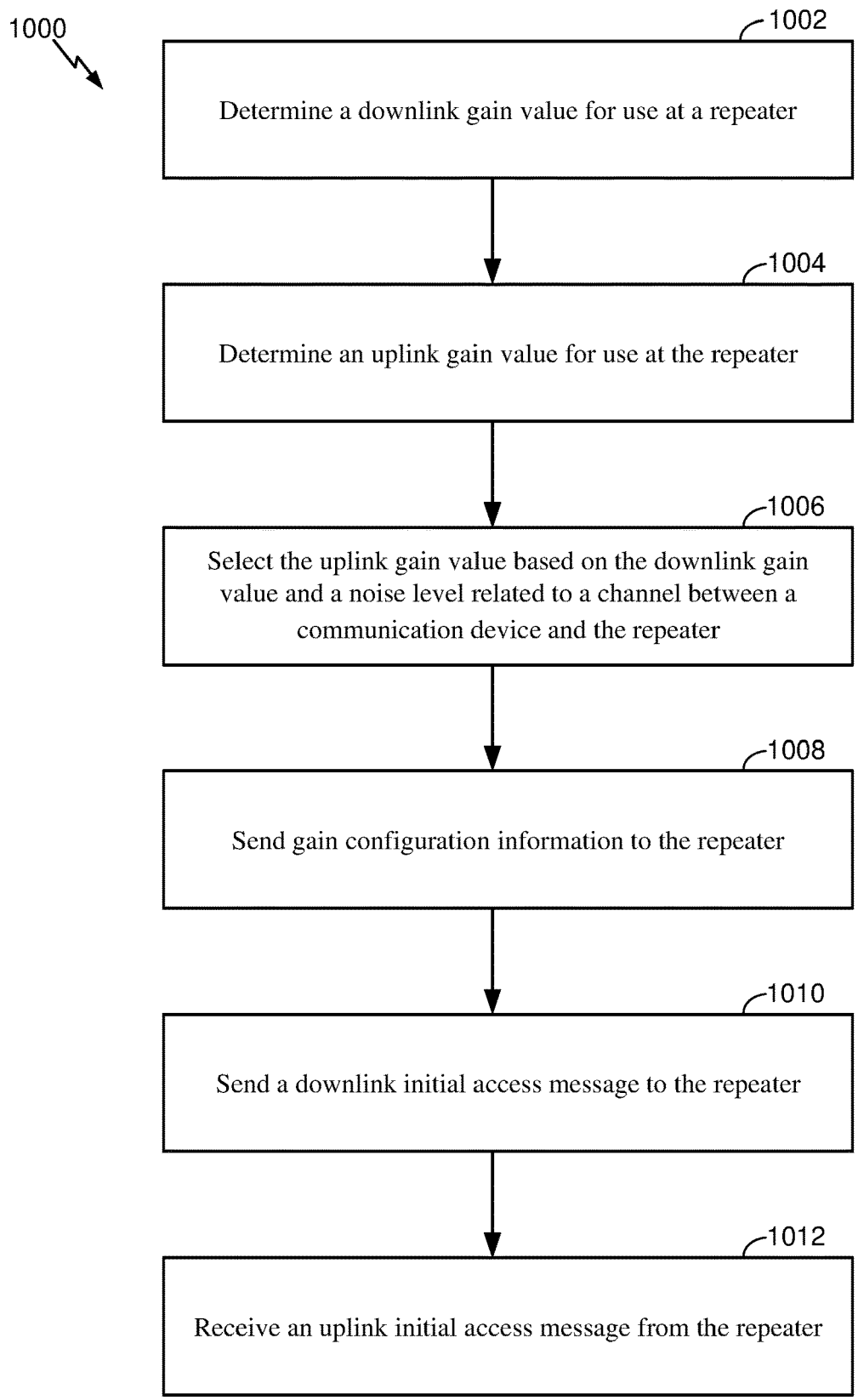
FIG. 10 is a flow diagram illustrating one example of a technique for a base station to determine a downlink gain value and an uplink gain value for use at a repeater.

FIG. 10 is a flow diagram illustrating one example of a process 1000 for a controlling node, such as a base station, to determine one or more gain values for a repeater as part of a wireless communication system where the repeater amplifies and relays communications between a first communication device (e.g., a UE, a base station, or another repeater) and a second communication device (e.g., a UE, a base station, or another repeater). In some systems, the operations of process 1000 may be implemented by a base station, such as base station 105 (FIGS. 1 and 4), base station 305 (FIG. 3), base station 502 (FIG. 5), base station 602 (FIG. 6) or one or more sub-components of the base station. For example, with reference to FIGS. 3 and 10, the operations of process 1000 may be performed by one or more transceivers 330 (e.g., the transmission and/or receiving actions of process 1000), one or more processors 210, and/or instructions stored in memory 215 that are executed by a processor 210 to enable the repeater to perform the recited actions (e.g., the processing actions of process 1000). Although FIG. 10 will be discussed below in connection with a system where a base station is the controlling node for the repeater, other types of controlling nodes (e.g., a UE, a second repeater, a second base station different from the base station that sends downlink traffic to be amplified at the repeater, a cloud-based management entity, another network entity or function, etc.) may execute the operations of process 1000 in alternative systems.

At block 1002, the base station determines a downlink gain value for use at the repeater for one or more downlink initial access messages received at the repeater. At block 1004, the base station determines an uplink gain value for use at the repeater for one or more uplink initial access messages received at the repeater. At block 1006, the base station selects the uplink gain value based on the downlink gain value and a noise level related to a channel between the communication device and the repeater. In some implementations, the processing of block 1006 may be considered a sub-portion of the processing of block 1004.

In some noise conditions, the base station may select the uplink gain value from multiple possible gain values by determining the noise level related to the channel between a UE and the repeater, comparing the noise level to a threshold, and selecting the uplink gain value to be equal to the downlink gain value in response to a determination that the noise level is below the threshold. In other noise conditions, the base station may select the uplink gain value by determining the noise level related to the channel between the communication device and the repeater, comparing the noise level to a threshold, and selecting the uplink gain value to be less than the downlink gain value in response to a determination that the noise level is above the threshold. The noise level determined by the base station or repeater for use in the uplink gain level selection process may be a signal-to-noise ratio (SNR) (which includes other ratios or metrics that quantify an amount of desired signal present in a communication relative to an amount of noise and/or interference present in the communication), and the threshold used for the comparison may be a SNR threshold.

At block 1008, the base station sends gain configuration information to the repeater that includes an indication of the downlink gain value, an indication of the uplink gain value, or both. Further details of the gain configuration information sent from the base station to the repeater are discussed above in connection with blocks 902 and 904 of FIG. 9. The various options and possible configurations discussed in connection with blocks 902 and 904 also apply to the corresponding base station processing of gain configuration information at block 1008.

At block 1010, the base station sends a downlink initial access message to the repeater to be amplified based on the downlink gain value. The downlink initial access message may be a synchronization signal block (SSB) message or another type of downlink message. Further details of the transmission and amplification of the downlink initial access message are discussed above in connection with blocks 906 and 908 of FIG. 9. At block 1012, the base station receives an uplink initial access message from the repeater that is amplified based on the uplink gain value. The uplink initial access message may be a random-access channel (RACH) preamble message (e.g., RACH Msg1) or another type of uplink message. Further details of the transmission and amplification of the uplink initial access message are discussed above in connection with blocks 910 and 912 of FIG. 9. The actions in blocks 1010 and 1012 may not be performed by the controlling node in some implementations. In some systems, the controlling node that configures one or more gain values at the repeater may be the same base station that exchanges data traffic with the repeater. In this example, the base station may perform blocks 1010 and 1012. In other systems, the controlling node may be a different entity than the base station that exchanges data traffic with the repeater, and thus the controlling node may not perform the operations of blocks 1010 and 1012.

As discussed above, in some noise conditions, the repeater may apply an uplink gain value to uplink communications that is lower than the downlink gain value applied to downlink communications. Although this lower uplink gain may help reduce the impact of a potential repeater noise boosting situation that could add to the noise received at the base station, the lower uplink gain value may also disadvantage a UE communicating through the repeater that uses this lower uplink gain value. The controlling node, such as a base station, may attempt to reduce the negative impact of the lower uplink gain value at the repeater by configuring the UE that communicates through this repeater to transmit at a higher power level than it would otherwise use for a given uplink communication. Having the UE transmit at a higher level may allow the base station to receive the uplink transmission at a target receive power even though the repeater uses a lower uplink gain value. The controlling node (e.g., base station or other entity) may configure the UE operating through the repeater with a different power configuration (with a higher transmission power level) than UEs not operating through the repeater. In some implementations, the base station is able to configure the transmit power of the UE for the initial access procedure. In other implementations, the base station may not be able to configure the UE transmit power for the initial access procedure but may configure the power of the UE for a non-initial RACH messages or other uplink messages.

In one implementation, the controlling node (e.g., base station or other entity) may configure different UEs with different transmit power configurations based on whether or not an individual UE communicates with the base station through a repeater (or whether a repeater uses an uplink gain that is lower than the downlink gain). For example, the base station may send a first power configuration message to a first UE that communicates with the base station through the repeater. The first power configuration message comprises a first transmission power level to be used at the first UE for transmission of an uplink message. The base station also sends a second power configuration message to a second UE that communications with the base station without the repeater. The second power configuration message comprises a second transmission power level to be used at the second communication device for transmission of an uplink message. To account for the relatively low gain value at the repeater (e.g., when the uplink gain value is less than the downlink gain value at the repeater), the base station may set the first transmission power level for the first UE to be higher than the second transmission power level for the second UE based on a selection of the uplink gain value for the uplink initial access message from the communication device to be less than the downlink gain value at the repeater.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Furthermore, although certain aspects may be described or claimed in the singular, the plural is contemplated unless limitation to the singular is explicitly stated.

What is claimed is:

1. A repeater that relays communications, comprising:
   a processor; and
   a memory coupled with the processor, wherein the memory includes instructions executable by the processor to cause the repeater to:
   determine a downlink gain value to use for one or more downlink initial access messages received at the repeater;
   determine an uplink gain value to use for one or more uplink initial access messages received at the repeater, wherein the uplink gain value is based on the downlink gain value and a noise level related to a channel between a communication device and the repeater;
   receive a downlink initial access message;
   apply the downlink gain value to the downlink initial access message;
   receive an uplink initial access message; and
   apply the uplink gain value to the uplink initial access message.

2. The repeater of claim 1, wherein the downlink initial access message is a synchronization signal block (SSB) message and the uplink initial access message is a random-access channel (RACH) preamble message.

3. The repeater of claim 1, wherein the memory includes instructions executable by the processor to cause the repeater to:
   transmit a gain adjusted version of the downlink initial access message to the communication device via one or more transmission antennas of the repeater; and
   transmit a gain adjusted version of the uplink initial access message to the base station via one or more transmission antennas of the repeater.

4. The repeater of claim 1, wherein the memory includes instructions executable by the processor to cause the repeater to:
   receive gain configuration information at the repeater from a controlling node, wherein the gain configuration information includes an indication of the downlink gain value, an indication of the uplink gain value, or both.

5. The repeater of claim 4, wherein the instructions executable by the processor to cause the repeater to determine the downlink gain value comprise instructions executable by the processor to cause the repeater to identify the downlink gain value from the gain configuration information received from the controlling node.

6. The repeater of claim 4, wherein the instructions executable by the processor to cause the repeater to determine the uplink gain value comprise instructions executable by the processor to cause the repeater to identify the uplink gain value from the gain configuration information received from the controlling node.

7. The repeater of claim 6, wherein the gain configuration information includes an explicit indication of the uplink gain value for use at the repeater.

8. The repeater of claim 6, wherein the gain configuration information includes an offset value, and the memory includes instructions executable by the processor to cause the repeater to calculate the uplink gain value based on a reduction relative to the downlink gain value by an amount of the offset value.

9. The repeater of claim 4, wherein the gain configuration information includes an instruction for the repeater to set the uplink gain value to be equal to the downlink gain value in response to the noise level being below a threshold.

10. The repeater of claim 4, wherein the gain configuration information includes an instruction for the repeater to set the uplink gain value to be less than the downlink gain value in response to the noise level being above a threshold.

11. The repeater of claim 1, wherein the instructions executable by the processor to cause the repeater to determine the uplink gain value comprise instructions executable by the processor to cause the repeater to:

determine the noise level related to the channel between the communication device and the repeater;
compare the noise level to a threshold; and
select the uplink gain value to be equal to the downlink gain value in response to the noise level being below the threshold.

12. The repeater of claim 1, wherein the instructions executable by the processor to cause the repeater to determine the uplink gain value comprise instructions executable by the processor to cause the repeater to:
determine the noise level related to the channel between the communication device and the repeater;
compare the noise level to a threshold; and
select the uplink gain value to be less than the downlink gain value in response to the noise level being above the threshold.

13. The repeater of claim 1, further comprising:
one or more receive antennas; and
one or more transmit antennas;
wherein the one or more receive antennas are configured to receive the uplink initial access message as an analog millimeter wave signal based on receive beamforming;
wherein the instructions executable by the processor to cause the repeater to apply the uplink gain value comprise instructions executable by the processor to cause the repeater to amplify the analog millimeter wave signal without performing analog-to-digital conversion of the analog millimeter wave signal; and
wherein the one or more transmit antennas are configured to transmit a gain adjusted version of the analog millimeter wave signal via one or more transmit antennas and based on transmit beamforming.

14. A method of wireless communication performed by a repeater that relays communications, comprising:
determining a downlink gain value to use for one or more downlink initial access messages received at the repeater;
determining an uplink gain value to use for one or more uplink initial access messages received at the repeater, wherein the uplink gain value is based on the downlink gain value and a noise level related to a channel between a communication device and the repeater;
receiving a downlink initial access message;
applying the downlink gain value to the downlink initial access message;
receiving an uplink initial access message; and
applying the uplink gain value to the uplink initial access message.

15. The method of claim 14, further comprising:
receiving gain configuration information at the repeater from a controlling node, wherein the gain configuration information includes an indication of the downlink gain value, an indication of the uplink gain value, or both.

16. The method of claim 15, wherein the gain configuration information includes an offset value, and the method further comprises calculating the uplink gain value based on a reduction relative to the downlink gain value by an amount of the offset value.

17. The method of claim 14, wherein determining the uplink gain value comprises:
determining the noise level related to the channel between the communication device and the repeater;
comparing the noise level to a threshold; and
selecting the uplink gain value to be equal to the downlink gain value in response to the noise level being below the threshold.

18. The method of claim 14, wherein determining the uplink gain value comprises:
determining the noise level related to the channel between the communication device and the repeater;
comparing the noise level to a threshold; and
selecting the uplink gain value to be less than the downlink gain value in response to the noise level being above the threshold.

* * * * *